United States Patent
Forsyth et al.

[15] 3,659,666
[45] May 2, 1972

[54] ARTICULATED VEHICLE

[72] Inventors: John P. Forsyth; Robert W. Forsyth, both of 1517 North 3rd Avenue, San Bernardino, Calif. 91786

[22] Filed: Oct. 2, 1969

[21] Appl. No.: 870,438

[52] U.S. Cl. .................................180/6.2, 115/1 R, 180/23
[51] Int. Cl. .......................................................B62d 11/02
[58] Field of Search..................180/6.2, 6.48, 22, 23, 24, 180/51, 52; 280/5.2; 115/1 R

[56] References Cited

UNITED STATES PATENTS

| | | | |
|---|---|---|---|
| 1,829,808 | 11/1931 | Opolo | 180/6.2 |
| 3,129,780 | 4/1964 | Uyehara | 180/23 |
| 3,161,172 | 12/1964 | Kassbohrer | 180/24 X |
| 3,183,991 | 5/1965 | Gamaunt | 180/24 |
| 3,198,551 | 8/1965 | Garner | 180/6.48 X |
| 3,204,713 | 9/1965 | Shanahan et al. | 180/6.48 X |
| 3,351,037 | 11/1967 | Meili | 180/23 X |
| 3,444,837 | 5/1969 | Donofrio | 115/1 |

*Primary Examiner*—Benjamin Hersh
*Assistant Examiner*—Leslie J. Paperner
*Attorney*—Roger A. Marrs

[57] ABSTRACT

An articulated wheeled vehicle is disclosed herein having a front and a rear body portion pivotally joined together by a central axle rotatably mounted on opposing projections carried on the body portions. Axles are rotatably carried on each of the front and rear body portions so that a six-wheeled, three-axle vehicle is produced. Each axle comprises a pair of coextensive segments mounted in suitable bearings and each segment is separately powered via a drive train and transmission by a power plant so that directional control and speed of the vehicle can be attained since the axle segments may be rotated individually at different speeds and directions.

7 Claims, 9 Drawing Figures

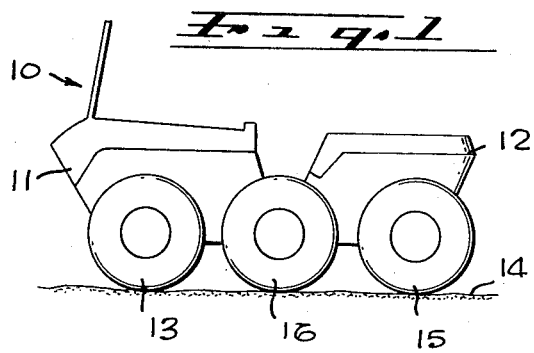
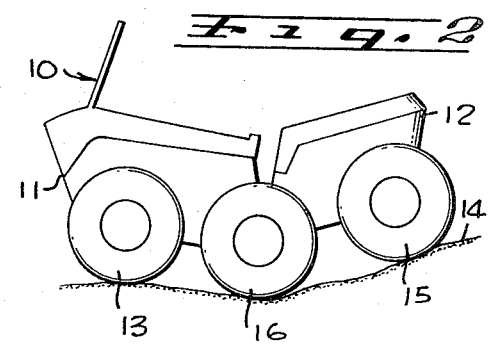
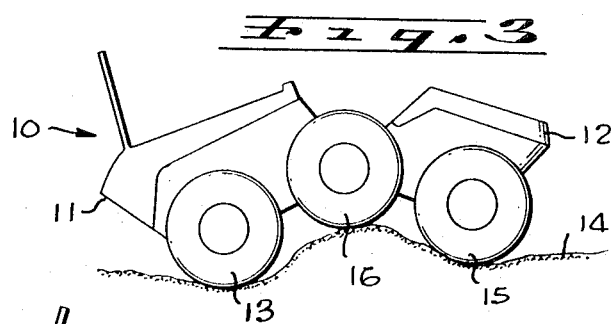
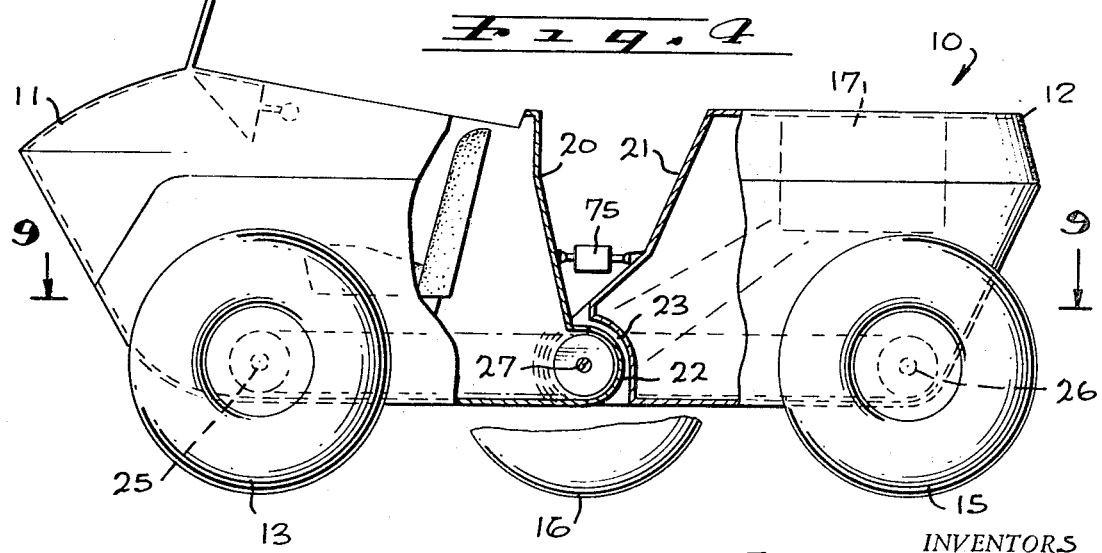

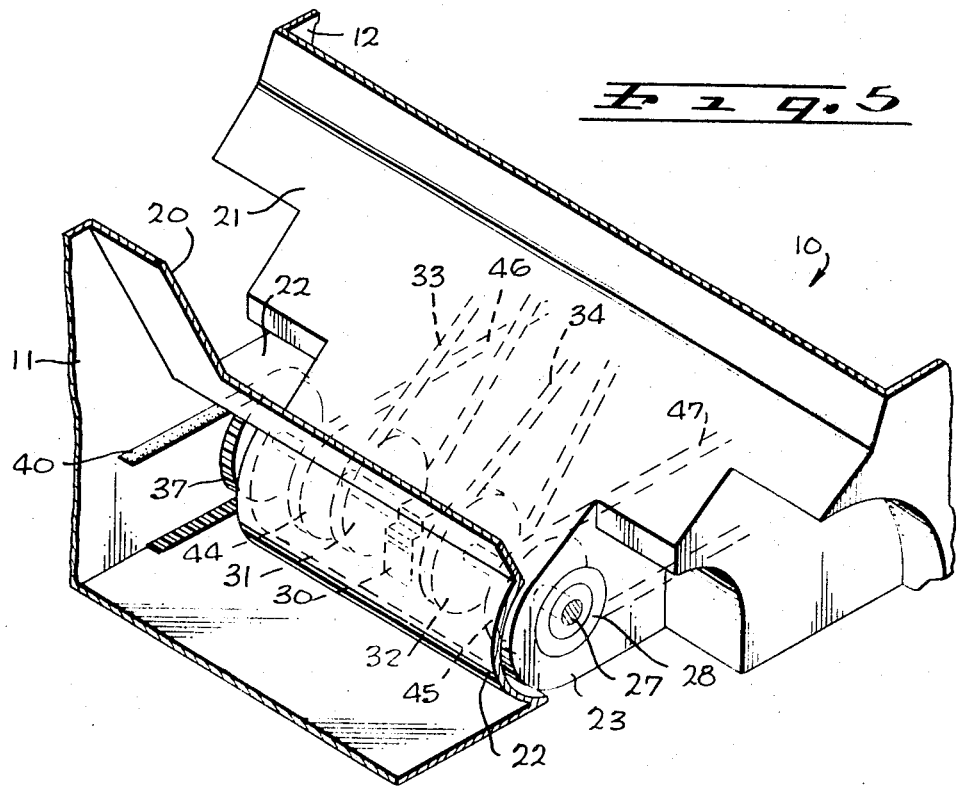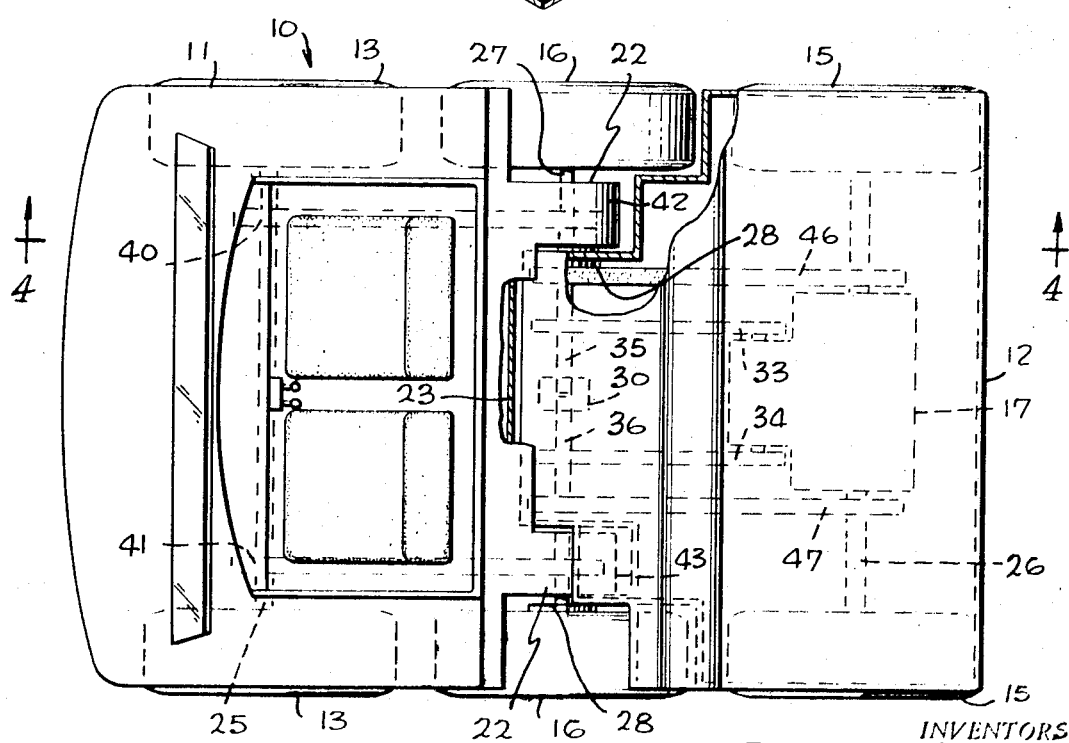

PATENTED MAY 2 1972
3,659,666
SHEET 3 OF 3
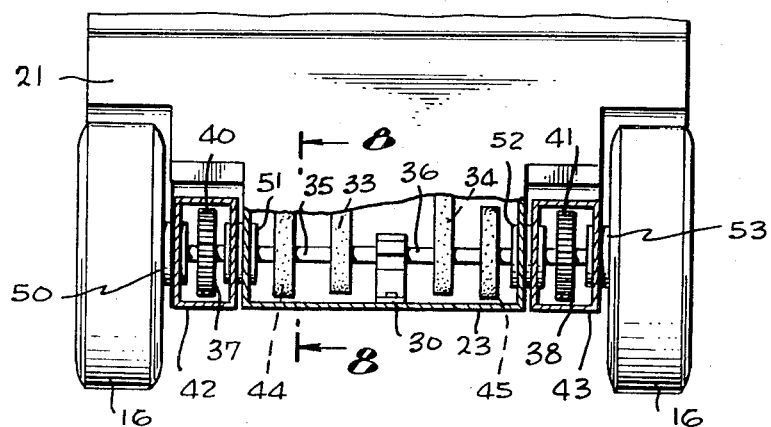
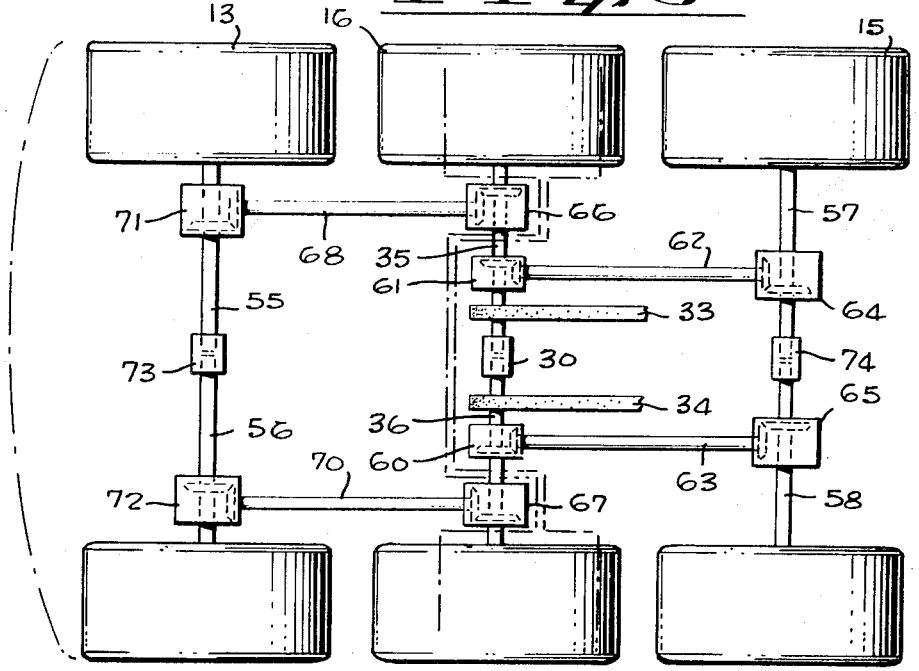
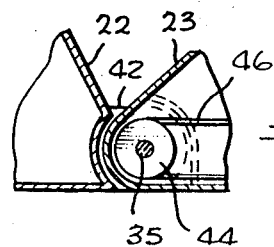
JOHN P. FORSYTH
ROBERT W. FORSYTH
INVENTORS
BY Roger A. Marrs

ARTICULATED VEHICLE

BACKGROUND OF THE INVENTION

1. Field of the Invention

This invention relates to articulated wheeled vehicles and, more particularly, to novel vehicles having pivotally mounted body portions and segmented axles fully driven by a common power unit and operable to independently control vehicular direction and velocity.

2. Description of the Prior Art

In the broad field of articulated vehicles, conventional vehicles generally comprise two or more body elements with provision made for semi-independent motion of the elements with respect to each other. The prior art is relatively extensive. The art ranges from the very common truck-tractor and semi-trailer combinations to rather complex, prototype military vehicles in which provision is made for semi-independent motion of the body elements in pitch, roll, and yaw.

Specifically related to this broad field are articulated vehicles in which the body elements of the vehicle are arranged so as to permit rotational displacements in a longitudinal, vertical plane as the body elements pivot about a lateral pitch axis. The most common example of this configuration is the prime mover and trailer joined by a ball-type hitch. Also, there may be vehicles designed in which relative motion in pitch is provided between body elements which are joined together in a more or less permanent manner.

The fundamental disadvantage, common to all prior art in semi-permanently joined, articulated or hinged-frame vehicles is that the means employed to provide for semi-independent motion of the vehicle elements are costly, complex mechanisms, incorporating many close-fitting, precision parts, partially or completely exposed to the elements and the entry of foreign matter and, thus, prone to malfunction and failure, and requiring constant maintenance.

This disadvantage is even more pronounced in those vehicles in which articulation or hinging of the vehicle elements is found in conjunction with an all-wheel drive system with power being transmitted from one element to the other by mechanical means routed through the articulation joint. In addition to the joint itself, this generally involves the use of drive shafts incorporating sliding sections in telescoping relationship to accommodate changes in length from the centers of constant-velocity, universal joints. Such components are needed to assure constant rotational speed of the shafts on both sides of the universal joints through the whole 360° of rotation. As may be readily appreciated, being exposed as they generally are, such drives require complicated lubrication systems and a number of specially constructed dust and lubrication seals for the shafts and universals.

The problem is further compounded and the designs usually infinitely more complex in such vehicles when they are configured to enable amphibious operation. Added to the normally difficult task of sealing the body elements of the vehicle at the axles, is the problem of sealing around the attachments and fittings of the articulation joint or hinge, and sealing around the drive shafts transmitting power between vehicle elements.

SUMMARY OF THE INVENTION

Accordingly, the problems and difficulties encountered with conventional articulated vehicles are obviated by the present invention which provides a wheeled vehicle constructed with a pair of body portions joined at a central axle by mated projections carried on and integrally formed with the body portions. Means are provided for rotatably securing the mated projections to the central axle so that, with the axle acting as a hinge pin, the body portions may be rotatably displaced with respect to each other. Therefore, the vehicle is provided with the capability of following or conforming during travel to irregularities in the terrain. A front and rear axle are rotatably carried on the pair of body portions respectively, so that a six-wheel, three-axled vehicle is produced. Each axle comprises a pair of coextensive linear segments and each segment is rotatably driven by a common power plant via a suitable drive train including a dual output transmission. Thereby, the axle segments may be independently driven in terms of rotational direction and velocity so that a steerable vehicle is produced.

A major feature of the invention resides in the hinged construction and assembly of the vehicle body portions so as to provide semi-independent, rotational displacement of the body portions in a longitudinal, vertical plane as the portions pivot about a lateral pitch axis.

Therefore, it is among the primary objects of the present invention to provide a ground vehicle with the capability of conforming to irregularities in terrain by permitting displacement, relative to each other, of portions of the vehicle's body and attached running gear. Conformance to terrain irregularities in this manner will enable maintenance of full ground contact of all wheels at all times, permitting the development of maximum tractive effort, enabling the generation of maximum braking effect in emergencies, and resulting in an exceptionally stable vehicle.

Another object of this invention is to provide for the diminishment and damping of the shocks incident to traveling over irregular terrain through close conformance of the vehicle's body and attached running gear to the profile of the terrain, and by a progressively greater constraint of displacement of the vehicle's body segments when vertically accelerated as obstacles are struck by the vehicles's running gear.

Still another object of the invention is to provide a novel means of enabling displacement, relative to each other, of the vehicle's body portions and attached running ear which is mechanically simple and, further, assuring that maximum use is made of standard vehicle parts and structures so that these vehicle parts and structures perform multiple functions, thereby reducing the total number of parts required per vehicle, keeping the total weight of the vehicle to a minimum and keeping cost to a minimum.

A further object of this invention is to provide a means of hinging the body portions of an all-wheel drive, ground vehicle in which means maximum compatibility is achieved with the requirements entailed in making the vehicle "waterworthy" (for example, assuring buoyancy with a water-tight body) by virtue of keeping to an absolute minimum the number of seals incorporated in the body portions for power-transmission means, axle shafts, and components of the hinging means.

Yet another object of the present invention is to provide a novel articulated vehicle having segmented axle shafts whereby each segment may be individually controlled to effect selective steering and velocity.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a side elevational view of the novel articulated vehicle of the present invention illustrated on level terrain;

FIGS. 2 and 3 are views similar to FIG. 1 showing the vehicle on uneven or irregular terrain;

FIG. 4 is an enlarged elevational view, partly in section, of the vehicle as taken in the direction of arrows 4—4 of FIG. 6;

FIG. 5 is a perspective fragmentary view of the central axle pivotally joining the front and rear portions of the vehicle;

FIG. 6 is a top plan view of the vehicle having a portion broken away to expose underlying components;

FIG. 7 is a front elevational view, partly in section, showing the vehicle drive train;

FIG. 8 is a cross-sectional view of the central axle region as taken in the direction of arrows 8—8 of FIG. 7; and FIG. 9 is a transverse cross-sectional view of the axle drive train shown in FIG. 4 as taken in the direction of arrows 9—9 thereof.

DESCRIPTION OF THE PREFERRED EMBODIMENT

Referring to FIGS. 1, 2, and 3, the articulated vehicle of the present invention is indicated in the general direction of arrow 10 which includes a vehicle body comprising a front or forward portion 11 and a rear portion 12. The front portion includes a set of wheels 13 while the rear portion 12 is rollably supported on the terrain 14 via a set of wheels 15. Disposed between the front and rear sets of wheels, there is provided a central set of wheels 16 providing additional rolling support for the vehicle body. Preferably, the front portion 11 may be suitably occupied by the driver and includes the necessary controls for operating the vehicle. The rear portion 12 is employed for mounting a power plane 17 and may include seats intended to be occupied by passengers, although the front portion may readily accommodate passengers as well as the driver. As shown in the figures, the front and rear portions are arranged in end-to-end relationship having their adjacent and opposing ends supported by the central wheel set 16. Preferably, the opposing ends of the body portion are angularly displaced with respect to each other so as to permit relative movement therebetween as indicated in FIGS. 2 and 3 when the vehicle is traversing irregular terrain. It is to be particularly noted that all three wheel sets are rollably engaged with the surface of the terrain whether or not that surface is smooth or irregular. As a consequence, increased traction and vehicle stability is effected.

Referring now to FIG. 4, it can be seen that the opposing end surfaces 20 and 21 of the body portions appear to converge from the top edge of the vehicle's body towards the underside thereof so as to terminate in mated projections 22 and 23 so as to be nested together in pivotal relationship.

The front wheel set 13 is rotatably supported on the front portion 11 via an axle assembly 25. The rear wheel set 15 is rotatably supported on the rear body portion 12 via an axle assembly 26, while the central wheel set 16 is supported by a central axle assembly 27.

Referring to FIGS. 5 and 6, it can be seen that the rear projection 23 is extended into a receptacle formed in the front projection 22 so as to be rotatably nested therein by means of the axle assembly 27. The central axle assembly 27 is supported on its opposite ends by bearing 28 and by a split axle bearing 30 disposed along the center line of the vehicle's body. Power is provided to the central axle from power plant 17 via drive sprockets or pulleys 31 and 32 via chains or belts indicated by numerals 33 and 34 which are suitably coupled to the power plant transmission.

The central axle assembly 27 is composed of a pair of axle segments 35 and 36 which are coextensive and are mounted between the split axle bearing 30 and the outside bearing 28, respectively. Such construction permits the axle segments to be independently driven by means of the drive sprockets or pulleys 31 and 32, respectively. It is to be understood that the front axle assembly 25 and the rear axle assembly 26 are composed of an identical split shaft construction wherein the axle includes a pair of coextensive segments that are permitted independent and separate rotation. The front right and left axle segments are driven by means of a pair of drive sprockets or pulleys 37 and 38 carried near the end of central axle segments 35 and 36, respectively, and which include a chain or belt drive indicated by numerals 40 and 41 for operably rotating the axle segments of the front axle assembly 25. The front drive sprockets 37 and 38 are enclosed by extensions 42 and 43 forming a part of projection 22.

The rear axle assembly segments are independently driven by means of drive sprockets or pulleys 44 and 45 via interconnecting chains or belts 46 and 47 which form an endless drive about the sprockets or pulleys fixedly mounted on central axle segments 35 and 36 as well as similar types of sprockets or pulleys mounted on the respective segments of the rear axle assembly 26. It is to be noted that rear drive sprockets 44 and 45 are housed within the section of projection 23 which is nested between the extensions 42 and 43 of projection 22. Suitable seals and other bearings may be employed to protect the drive sprockets and axle shaft segments from adverse effects of environment whether the vehicle is driven on dusty roads, muddy terrain or through a body of water as an amphibious vehicle. Suitable seals are indicated by numerals 50, 51, 52, and 53 in FIG. 7 which shows the drive train arrangement for rotating central axle segments 35 and 36 for not only rotating wheel set 16 but for operably driving the wheel axle segments for wheel sets 13 and 15.

In FIG. 8, the drive means for the rear wheel set 15 is illustrated in which the central axle segment 35 drives sprocket 44 which in turn is operably connected to its associated rear axle segment via chain or belt 46. Also, the hinge connection between the front projection 22 and the rear projection 23 is illustrated so that the front body portion 11 may be pivotally connected or disposed with respect to the rear body portion 12.

Referring now in detail to FIG. 9, an alternate drive means is illustrated wherein each of the wheel sets includes a pair of axle segments or shafts as previously described. For example, the central axle assembly 27 includes coextensive shaft segments 35 and 36, the front axle assembly 25 includes axle shaft segments 55 and 56 and rear axle assembly 26 includes shaft segments 57 and 58. Drive sprockets 31 and 32 are fixedly secured to the respective shafts 35 and 36 and chains or belts 33 and 34 operably connect the axle segments to the power plant transmission. However, in place of the drive sprocket and chain or belt and pulley assemblies previously described with respect to power transmission for driving the front and rear axle assemblies, a plurality of gear boxes are employed as a substitute. As an example, gear boxes 60 and 61 include beveled gears interconnecting the respective axle segments to intermediate drive shafts 62 and 63 which terminate in a beveled gear arrangement enclosed in rear gear boxes 64 and 65 for driving the axle segments 57 and 58. The front axle segments 55 and 56 are driven by means of gear boxes 66 and 67 housing beveled gears for transmitting torque to front intermediate drive shafts 68 and 70 having their ends rotatably engaged with front axle segments 55 and 56 via beveled gears housed within gear boxes 71 and 72. Split axle bearings 73 and 74 are employed to rotatably support the opposite ends of the axle assemblies 25 and 26. Bearings 73 and 74 are identical in design and construction as bearing 30.

While not illustrated in detail in the drawing, it can be appreciated that progressively increasing restraint of the rotational displacement of the body portions may be obtained by incorporating an energy absorbing means or device 75 between the opposing ends of the body portions as indicated in FIG. 4. For example, double-acting, air/oil, shock absorbers could be placed between the body portions opposite faces 20 and 21 above the centerline of the central axle. Another means would entail the placement of toroidal shaped, rubber "springs" between the sides of the projections of the body portions. The "springs" are concentric with the central axle and have their opposite faces bonded to the sides of the projections. Another alternative would be to incorporate spiral, torsional springs in the same location as the rubber "springs." In this arrangement, the spindle of the spring is attached to one body portion projection and its end is attached to the other. The spring on one side of the vehicle would be oriented to progressively restrain upward pitching of the body segments while the spring on the other side would be oriented for action on downward pitching of the body segment.

As shown in the drawings, the invention is embodied in a three-axle, six-wheel, all-wheel drive, amphibious vehicle. In this vehicle, a chain drive or "cog belt" drive would be used to transmit power from the transmission to the three axles. The central axle functions as the hinge pin to which the projections of the body portions are secured by having the axle pass through small holes located in the sides of the projections. At the points where the central axle passes through the sides of the projections, it is mounted in bearings having integral, watertight seals. As may further be determined from the drawing, the central axle is split in half, as are the leading and trailing axles. The inboard ends of each half are mounted in a bearing block at the center of the vehicle. The halves of the split axles may be run at different rotational speeds, or may even be run counterrotationally with respect to each other. The purpose of this arrangement is to make it possible, by the use of a dual output, controllable transmission, to steer the vehicle by imposing differences in the speed of the wheels on the right and left sides of the vehicle. For example, if the three wheels on the right side of the vehicle are slowed down, stopped, or reversed while the wheels on the left side are given more power, the tractive force produced on the left side, operating over a lever arm extending across the tread of the vehicle, will cause it to turn to the right, pivoting about the wheels on the right side. In effect, a skid-steering system is produced.

A principal feature of this invention resides in the manner in which the vehicle's body portions are hinged to provide for semi-independent, rotational displacement of the body portions in a longitudinal, vertical plane as the portions pivot about a lateral pitch axis.

This hinging action is accomplished by making components of the vehicle perform multiple functions. The central axle mounts the center wheels and serves as a countershaft for transmission of power to the leading and trailing axles by means of a chain or belt drive. The central axle also serves as the hinge pin about which the vehicle's body portions pitch in the longitudinal, vertical plane. The body portions, of course, contain the passengers and cargo, provide the space and mounts for the power package, and carry the axles and wheels. They also function as elements of the hinge. The projection of the rear, or trailing body portion, which extends forward across the front, center of the portion, serves as the tenon of the hinge. The two projections extending back on either side of the front, or leading body portion form between them the mortise of the hinge into which the tenon fits. In fabrication of the vehicle, these projections would be integrally formed with the body portions.

As is obvious from the foregoing, detailed description of the hinge, a very significant advantage is that it can be easily and readily formed and assembled and requires very few machined, precision parts. This minimizes the cost of manufacture, enhances reliability, and simplifies maintenance. Also, the manner in which the hinge is configured, when considered in conjunction with the use of a chain drive or "cog belt" drive and the utilization of the central axle as a countershaft, greatly simplifies the transmission of power from one vehicle body portion to the other and especially when contrasted with the mechanisms employed in contemporary articulated vehicles. Additionally, it facilitates sealing the body portions for amphibious operation and fully encloses and protects the drive train from the elements and the entry of dirt and foreign matter.

Two other features of the subject invention are the use of a skid-steering system in a multi-element, hinged vehicle, and the fact that the two body portions are prevented from "-sagging" at the hinge point by virtue of the use of a central axle as the hinge pin.

The overall advantage of hinging the vehicle body portions relates to giving the vehicle the capability to conform to terrain irregularities and to maintain maximum ground contact of the wheels in all vehicle attitudes, enhancing traction, braking effect, and vehicle stability. The bending or flexing of the vehicle about the pitch axis also aids in absorbing the shocks incident to traversing rough, irregular terrain. It is useful, too, when the vehicle is negotiating a bank coming out of water, since it would permit the front, or leading body portion to assume a pitched-up attitude to mount the bank while the rear, or trailing portion remained level and stable in the water.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A pitch-axis articulated vehicle comprising:
a vehicle body having a front body portion and a rear body portion;
hinge means with an axis coincident with the laterally disposed pitch axis of said vehicle, said hinge means including a hinge pin connecting the opposing ends of said front and rear body portions together;
projections included in said hinge means and fixedly carried on and integrally formed with each of the opposing ends of said front and rear body portions and arranged in a mated relationship wherein said projections carried on a selected body portion include a pair of spaced apart extensions and the other of said projections carried on said other body portion is nested between said pair of extensions;
three wheel sets rotatably supporting said vehicle body on the ground in which two of said wheel sets are rotatably carried on said front and rear body portions respectively and said third wheel set's axle is incorporated into said hinge means as the hinge pin and is enclosed within and protected by said projections of said front and rear body portions; and
power means carried on said vehicle in is operable relationship with said wheel sets for imparting a driving force thereto.

2. The invention as defined in claim 1 wherein
each of said three wheel sets includes a pair of coextensive axle segments and each of said axle segments mounts a wheel of its associated one of said wheel sets; and
each of said axle segments is fixedly related to said body portions with respect to the point of passage through the sidewalls of said body portions and the said integrally formed projections thereof; and
wherein said power means includes a drive train operably connected to said axle segments for selectively driving predetermined ones of said axle segments to propel and steer the vehicle.

3. The invention as defined in claim 2 wherein
said power means includes a pair of drive means directly coupled to said axle segments respectively of said axle assembly associated with said third wheel set; and
intermediate drive means coupling each of said third wheel set axle segments to said first and second wheel set axle segments associated with said front and rear body portions respectively.

4. The invention as defined in claim 1 wherein
each axle assembly includes a pair of coextensive axle segments and each of said axle segments mounts a wheel of its associated one of said wheel sets.

5. The invention as defined in claim 4 wherein
said power means includes a drive train operably connected to each of said axle segments for selectively driving predetermined ones of said axle segments.

6. The invention as defined in claim 4 wherein
said power drive means includes a pair of drive means directly coupled to said axle segments respectively of said axle assembly associated with said third wheel set; and
intermediate drive means coupling each of said third wheel set axle segments to said first and second wheel set axle segments associated with said front and rear body portions respectively.

7. An articulated vehicle comprising:
a vehicle body having a front portion and a rear portion;
a first wheel set including a first axle assembly extending across and rotatably carried on said front body portion;

a second wheel set including a second axle assembly extending across and rotatably carried on said rear body portion;

a third wheel set disposed between said first and second wheel sets including a central axle assembly pivotally coupling said body portions together;

separate coupling means operably connected to each of said axles;

power means carried on said vehicle body operably connected to said coupling means to independently impart a driving force to each of said axles for vehicle movement and steering;

each axle assembly comprising a pair of axle segments having adjacent ends rotatably mounted in a split axle bearing;

said power means being coupled to said central axle segments and said central axle segments being coupled in driving relationship to said other axle segments;

said front and rear body portions including mated projections pivotally joined by said central axle assembly;

said body portions including opposing wall surfaces converging towards said projection mounted on said central axle assembly;

said vehicle body portions providing semi-independent rotational displacement in a longitudinal, vertical plane via said central axle assembly about a lateral pitch axis;

said mating projections being each integrally formed with opposing ends of the body portions of which they are a part;

said semi-independent rotational displacement of the body portions being subjected to progressively greater constraint by an energy absorbing means disposed between the body portions in the area of the pivot;

an energy absorbing means operably coupled between said front and said rear portions to yieldably restrain pivotal displacement of said portions relative to each other; and the opposing wall surfaces of said body portions angularly disposed with respect to each other in a substantially diverging relationship from said central hinged axis in an upward direction.

* * * * *